(12) United States Patent
Weber et al.

(10) Patent No.: US 6,683,734 B2
(45) Date of Patent: Jan. 27, 2004

(54) POSITIONING AN OBJECT

(75) Inventors: Andreas Weber, Wilgartswiesen (DE); Holger Bessler, Wildberg (DE)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 10/266,855

(22) Filed: Oct. 8, 2002

(65) Prior Publication Data

US 2003/0086185 A1 May 8, 2003

(30) Foreign Application Priority Data

Oct. 23, 2001 (DE) .......................... 101 52 219

(51) Int. Cl.⁷ ................................................ G02B 7/02
(52) U.S. Cl. ..................................................... 359/822
(58) Field of Search ................................. 359/819, 821, 359/822, 694

(56) References Cited

U.S. PATENT DOCUMENTS

| | | | | |
|---|---|---|---|---|
| 4,480,454 A | * | 11/1984 | Svagr | 72/78 |
| 5,222,283 A | * | 6/1993 | Laschet | 29/27 C |
| 5,561,564 A | | 10/1996 | Nakamura et al. | 359/825 |
| 5,826,470 A | * | 10/1998 | Tremblay | 82/113 |
| 6,557,215 B1 | * | 5/2003 | Graf | 19/108 |

FOREIGN PATENT DOCUMENTS

| | | |
|---|---|---|
| DE | 19943284 A1 | 3/2001 |
| JP | 01096612 A | 4/1989 |

OTHER PUBLICATIONS

English translation of the Abstract attached.

* cited by examiner

*Primary Examiner*—Ricky Mack
(74) *Attorney, Agent, or Firm*—Perman & Green, LLP

(57) ABSTRACT

The present invention concerns a device for positioning an object, consisting of a holder with a holding cup into which the object can be inserted in radial direction, wherein a rotation device is provided, which acts together with the object when the object is inserted in the holding cup and which allows for a rotational adjustment of the object around its longitudinal axis and relative to the holding cup. On the object, there is a drive component in the form of at least one radial ledge and/or at least one radial indentation into which the rotation device reaches when performing a rotational adjustment of the object.

19 Claims, 3 Drawing Sheets

POSITIONING AN OBJECT

BACKGROUND OF THE INVENTION

The invention refers to positioning an object.

U.S. Pat. No. 5,561,564 describes a lens drive, and JP-A-01096612 shows a holding device for anamorphous optical elements. From DE-A-1943284, a device for adjusting optical components is known.

SUMMARY OF THE INVENTION

It is an object of the present invention to enable suitable position adjustment of an object. This problem will be solved by the features of the independent claims. Advantageous embodiments are shown in the dependent claims.

Positioning of an object is necessary, for example, when assembling optical components, such as a laser module. In such systems, individual light-conducting components must be aligned or positioned relative to each other with high precision. To do so, certain components, in particular components with a cylindrical body, must be positioned by rotating to achieve the intended orientation. Optical components that must be positioned in this manner are, for example, lenses, prisms or filters, more particularly polarization filters. To achieve this, these components are held in a holder that can be positioned by rotation in the described manner.

In order to perform the rotational positioning of the respective object or the respective holder with respect to their longitudinal axis, a high effort with respect to the necessary equipment is necessary if there are very high requirements for the accuracy of the position adjustment. For the precise alignment of an optical lens in a laser module, for example, it may be necessary to position the lens holder with an accuracy of less than 1 $\mu$m. The accuracy of the achievable positioning can depend, among other factors, on the net mass of the components used for positioning and holding the object and on their elasticity.

The invention is based on the idea to provide a rotation device for the rotational adjustment of an object held by a holder where the rotation device makes possible the rotational adjustment of the held object with respect to the holder. In the positioning device according to the invention, the object is therefore rotated within a holding cup of the holder while the holder, and a holding arm that may be connected to it, remain stationary. This methods makes possible an extremely light construction for the rotation device because rather than turning the holder with the held object, or the holding arm with the holder and the held object, only the relatively small, and thus relatively light, object has to be rotated. With the achieved reduction in weight, the holder with the rotation device or the complete holding arm can be designed much lighter, thus reducing imprecision due to the net mass and the elasticity.

On the object to be positioned, there is a drive component in form of at least one radial ledge and/or at least one radial recess and the rotation device or positioning device engages with this drive component when making rotational adjustments of the object.

According to another embodiment, the rotation device can have a rotational drive located on the holder, which contains a first drive component, wherein the object to be positioned contains a second drive component, which is designed complementary to the first drive component and which reaches into the first drive component when the object is inserted into the holding cup.

In the above-mentioned embodiments, the rotation device thus acts directly together with the object to be positioned so that a component of the rotation device, i.e. the respective drive component, is formed directly on the object. This considerably reduces the equipment requirements on the holder, in particular reducing the weight. By creating the respective drive component on the object, an additional function is thus integrated in the object to be positioned.

The holding cup also has a double function because the object to be positioned rotates inside the holding cup during the adjustment so that the cup serves as a pivot bearing for the object.

In a first development, the first drive component can be created by a pin that extends parallel and eccentric to a rotational axis which is perpendicular to the longitudinal axis of the holding cup, wherein the first drive component with the rotational drive rotates around this rotational axis while the second drive component is created by a recess on the outer cover of the object into which the pin reaches. By rotating the pin around the mentioned rotational axis, it pulls along the object with the recess, driving it in direction of the circumference and causing the object to rotate around its longitudinal axis in the holding cup. This development can be realized especially economically.

In a second development, the first drive component can be created by a first conical gear wheel, the rotational axis of which is perpendicular to the longitudinal axis of the holding cup, wherein the second drive component is created by a second conical gear wheel, which is created on the object and which engages with the first conical gear wheel when the object is inserted in the holding cup and the rotational axis of which is concentric to the longitudinal axis of the object. While the drive using the pin and recess described above is relatively limited with respect to the possible angle range, such a gear wheel drive can be set to essentially any angular displacement. However, the design of the gear wheels is relatively expensive for relatively small components.

In a third development, the first drive component can be created by a first radial gear wheel, the rotational axis of which is perpendicular to the longitudinal axis of the holding cup, wherein the second drive component is created by a second radial gear wheel, which is created on the object and which engages with the first radial gear wheel when the object is inserted in the holding cup and the rotational axis of which is concentric to the longitudinal axis of the object. In this development, unlike in the previously described variation, the first gear wheel can be relatively large provided that there is sufficient space in radial direction on the holder.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s). It is shown schematically in FIG. 1 a perspective view of the device according to the invention.

DETAILED DESCRIPTION OF EXAMPLES OF ADVANTAGEOUS EMBODIMENTS OF THE INVENTION

Figure 1:
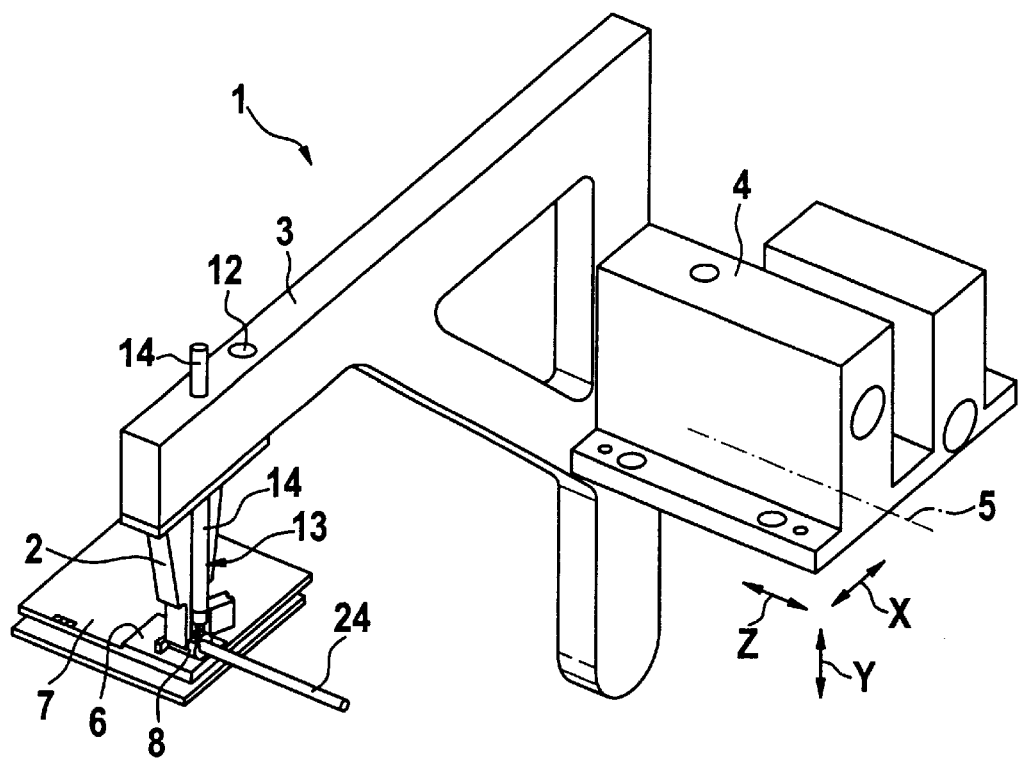

According to FIG. 1, a positioning device 1 according to the invention contains a holder 2, which is attached to a holding arm 3 according to a preferred embodiment. The holding arm 3 is suspended from a support 4 and can be swiveled around a trunnion axis 5. The support 4 itself may be adjustable in an x-z plane. The adjustability is simply symbolized by the arrows x and z. The trunnion axis 5 is parallel to the x-y plane. The holding arm 3 can be swiveled around its trunnion axis 5 between a working position shown in FIG. 1 and a loading and unloading position, in which the holder 2 is swiveled up and back with respect to the representation according to FIG. 1. In the loading and unloading position of the holding arm 2, a work piece can be placed onto a work table 7 or removed from it. It is practical for the work table 7 to be parallel to the x-z plane. An object 8 is to be positioned onto this work piece 6 in a predetermined manner, using the positioning device 1. To do so, the holding arm 3 with the object 8 held by it is swiveled into the working position in which the object 8 is at least in proximity of its intended position on the work piece 6. As soon as the desired position for the object 8 is reached, the object 8 can be attached to the work piece 6, for example by gluing it.

Figure 2:
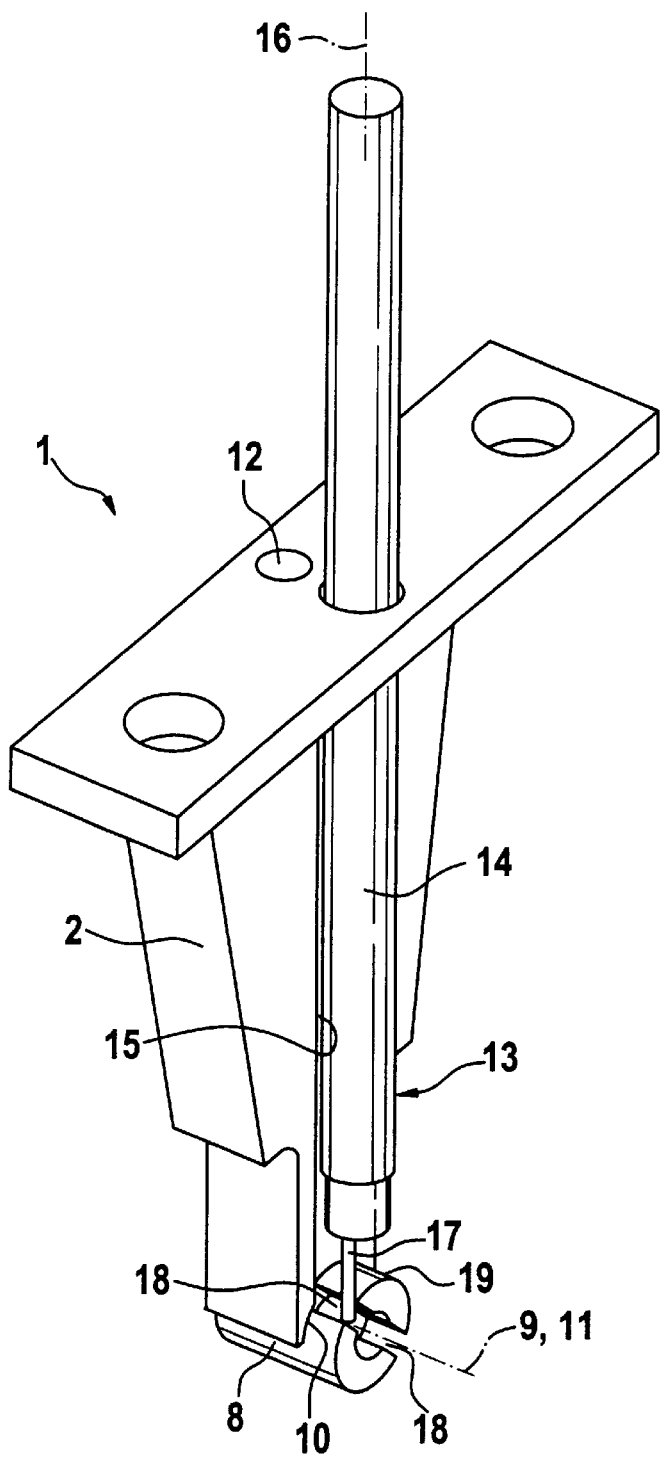
FIG. 2 an enlarged view of a holder of the device according to the invention.

According to the FIGS. 1 and 2, the object 8 to be positioned is shaped cylindrically, for example, and has a longitudinal axis 9. A cylindrical body here is understood to have a circular cross section. The holder 2 contains a holding cup 10 for holding the object 8, which is practically designed in cylinder segments, the radius of which is preferably approximately equal to the radius of the object 8. With this form design, the longitudinal axis 9 of the object 8 falls together with the longitudinal axis 11 of the holding cup 10 when the object 8 is inserted into the holding cup 10. Also a large surface area of the object 8 is in contact with the holding cup 10.

It is obvious that in principle any other form designs are possible for the object 8 and the holding cup 10 as long as the form design combination allows for a rotational adjustment of the object 8 with respect to the holding cup 10. The holding cup 10 can also be created by a v groove. The object 8 can also have another cylinder-like shape, such as a mirror cylindrical or an elliptic shape. With a star-shaped cross section, the object 8 could also be pivoted in a cylinder-like or cylindrical holding cup 10 of corresponding radius.

The object 8 can therefore be inserted into the holding cup 10 in radial direction, i.e. perpendicular to the longitudinal axis 11 of the holding cup 10. In direction of the circumference of the object 9, the holding cup 10 extends over an arc as large as possible, which cannot be more than 180° however. The holding cup 10, in turn, is arranged on the holder 2 or the holding arm 3 such that its longitudinal axis 11 runs parallel to the trunnion axis 5 of the holding arm 3. This ensures that the longitudinal axis 9 of the object 8 inserted into the holding cup 10 also runs parallel to this trunnion axis 5, and consequently parallel to the work table 7 or the x-z plane.

In order to hold the object 8 in the holding cup 10, a vacuum can be applied to the surface of the holding cup 10 via a suction tube 12, which runs inside the holder 2. The section of the suction tube 12 that is inside the holder 2 is extended by a section inside the holding arm 3 and can be connected to a corresponding suction device via a tube or the like, which is not shown here. When an object 8 is inserted in the holding cup 10, the vacuum applied causes adherence of the object 8 to the holding cup 10.

The positioning device 1 according to the invention also contains a rotation device 13, which is used to rotate an object 8 inside the holding cup 10 with respect to the holding cup 10 around a longitudinal axis 9, thus adjusting the rotational position of the object 8. It is particularly important here that the rotation device 13 drives the object 8 directly to make the rotational adjustment. In the preferred embodiment shown here, the rotation device 13 has a rotational drive 14, which rests on the holder 2 and is basically created by a straight rotational rod. This rotational rod extends along the holder 2, while there can also be a cup-shaped indentation 15 on the holder 5 in which the rotational rod 14 extends and which allows for a guided suspension of the rotational rod 14 on the holder 2. According to FIG. 1, the rotational rod 14 is located so that it also penetrates the holding arm 3. Accordingly, the rotational rod 14 or the rotation device 13 can be suspended on the holding arm 3. On the end of the rotational rod 14 that faces away from the holding cup 10, the rotational rod 14 can be driven in a rotational motion around its longitudinal axis. The longitudinal axis 16 of the rotational rod 14 in this case runs perpendicular to the longitudinal axis 11 of the holding cup 10 and may intersect it. A user of the positioning device 1 can apply force either directly to the rotational rod 14 or via a reducing gear transmission (not shown here). An electric motor drive may also be provided.

The rotation device 13 also contains a first drive component 17, which is created by a pin in this case. This pin 17 is attached on the end of the rotational rod 14 that faces the holding cup 10, wherein the pin 17 extends parallel and eccentric to the longitudinal axis 16 of the rotational rod 14. Accordingly, the pin 17 executes a circular rotation around the longitudinal axis 16 of the rotational rod 14 when the rotational rod 14 is rotated. The rotation device 13 also contains a second drive component 18 which is constructed on the object 8 and which is complementary to the drive component 17. In the embodiment shown here, the second drive component 18 is constructed by a recess in the shape of a gap on the outer cover of the object 8. When the object 8 is inserted into the holding cup 10, the pin 17 penetrates this gap 18 so that the two drive components 17 and 18 engage. During a rotational adjustment of the rotational rod 14, the pin 17 forces a rotational adjustment of the object 8 around its longitudinal axis 9 due to its close contact with the edge of the gap 18. The holding cup 10 in this case serves as a bearing for the object 8 while the adhesion between the object 8 and the holding cup 10 due to the vacuum allows for a rotational adjustment of the object 8 with respect to the holding cup 10. The angle range over which the rotational positioning of the object 8 can be executed is limited for this embodiment of the rotation device 13. In order to increase the setting range or provide a second setting range, the object 8 can have two or more gaps 18, as shown in this embodiment, wherein the gaps are located at different positions with respect to the circumference of the object 8.

As evident from FIGS. 1 and 2, the second drive component 18 or the gap 18 is created in an axial end section 19 of the object 8, wherein this end section 19 protrudes of the holding cup 10 in direction of the two coincident longitudinal axes 9 and 11 when the object 8 is inserted in the holding cup 10. With this design the rotational link is done beside the holding cup 10, and the connection between the co-acting drive components 17 and 18 is relatively well visible, facilitating inserting the object 8 in the holding cup 10 and inserting the pin 17 in the gap 18.

It is practical if the two gaps 18 shown here are shaped so that their edge has two opposite side walls parallel to the longitudinal axis 9 or the rotational axis of the object 8. It is also advantageous if the gaps 18 each extend to an axial end of the object 8 while the gaps 18 are open ended in axial direction. This design facilitates the insertion of the pin 17 when the object 8 is inserted into the holding cup 10.

Figure 3:
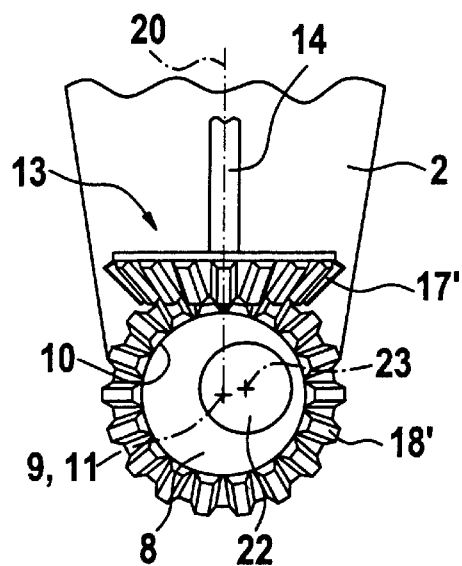
FIG. 3 a side view of holder in the area of the object to be positioned in another embodiment.

According to another embodiment shown in FIG. 3, the drive components 17' and 18' can be created by conical gear wheels. In this case, a first conical gear wheel 17' is installed so that its cross axis 20 is perpendicular, more particularly radial, to the longitudinal axis 11 of the half cup 10. A second conical gear wheel 18' is located on the object 8, wherein the rotational axis of the second conical gear wheel 18' falls together with the longitudinal axis 9 of the object 8. When the object 8 is inserted in the holding cup 10, the two conical gear wheels 17' and 18' are engaged. The first conical gear wheel 17' is attached to a shaft, which is a component of the rotational drive 14. By turning the rotational drive 14, the object 8 can be rotated around its longitudinal axis 9 with respect to the holding cup 10 via the gear wheel link. The set angle range is principally unlimited in this case.

Figure 4:
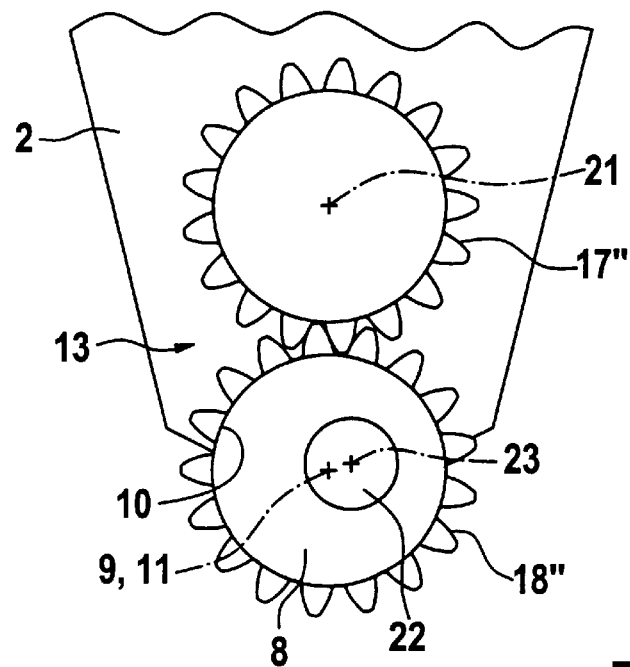
FIG. 4 a view as in FIG. 3, but of another embodiment.

In another embodiment according to FIG. 4, the drive components 17" and 18" can be created by radial gear wheels, namely a first radial gear wheel 17" and a second radial gear wheel 18". In this case, a rotational axis 21 of the first radial gear wheel 17" runs parallel to the longitudinal axis 11 of the half cup 10. The first radial gear wheel 17" in this case is suspended on the holder 2. In the representation of FIG. 4, the rotational drive 14 for driving the first radial gear wheel 17" is not shown. The second radial gear wheel 18" is located on the object 8, and this in a manner that the rotational axis of the second radial gear wheel 18" falls together with the longitudinal axis 9 of the object 8. When the object 8 is inserted in the holding cup 10, the two radial gear wheels 17" and 18" engage. In this embodiment, the angle range for the rotational adjustment of the object 8 is basically unlimited.

The object 8 in one preferred application of the positioning device 1 according to the invention is a holder for an optical component, such as a lens, a prism, or a filter. In FIGS. 3 and 4, this component is labeled 22. As shown in the figures, in particular in FIGS. 3 and 4, this component, a lens 22 for example, can be held eccentrically in the object 8, which is a holder. That is, an optical axis 23 or a middle axis 23 of the component 22 has a distance from the longitudinal axis 9 of the object 8. With a rotational adjustment of the object 8 or the lens holder 8, the axis 23 of the lens 22 can be positioned with respect to a y direction (cf. FIG. 1) perpendicular to the x-z plane.

The component 22, e.g. a polarization filter, can also be held concentrically in the object 8. With the rotational positioning of the object 8, the spatial alignment of the polarization filter 22 can be adjusted for example.

In a preferred embodiment, the work piece 6 is a laser module, which creates a laser beam (cf. FIG. 1), for example using a laser diode, that is supposed to exit from the laser module and be directed in a desired direction and parallel alignment by a lens. The lens in this case is held in the object 8 and must be positioned in the x-y-z space, wherein the positioning in y direction of the lens 22, which is held eccentrically in the object 8, is performed by the rotational adjustment of the object 8.

What is claimed is:

1. A device adapted for positioning an object, comprising:
   a holder with a holder cup into which the object can be inserted in radial direction, and
   a rotation device acting together with the object when the object is inserted into the holder cup, enabling a rotational adjustment of the object around its longitudinal axis with respect to the holding cup,
   wherein the object comprises a drive component having at least one of a group comprising a radial ledge and a radial indentation, wherein the rotation device interacts with the drive component for performing a rotational adjustment of the object.

2. The positioning device according to claim 1, wherein the rotation device has a rotational drive located on the holder, which contains a first drive component, wherein the object contains a second drive component, which is designed complementary to the first drive component and which reaches into the first drive component when the object is inserted into the holding cup.

3. The positioning device according to claim 2, wherein the rotation device contains a rotational rod which extends along the holder and perpendicular to the longitudinal axis of the holding surface and which is connected to the holder and rotates around its longitudinal axis.

4. The positioning device according to claim 2, wherein the first drive component is created by a pin which extends parallel and eccentrically to a rotational axis, which extends perpendicularly to the longitudinal axis of the holding cup wherein the first drive component rotates around this rotational axis by means of the rotational drive and wherein the second drive component is created by a recess, which is created on the outer cover of the object and into which the pin extends.

5. The positioning device according to the claims 3, wherein the pin is created on the end of the rotational rod facing the holding cup and protrudes from the rotational rod parallel and eccentric to the longitudinal axis of the rotational rod.

6. The positioning device according to claim 2, wherein the first drive component is created by a first conical gear wheel, the rotational axis of which extends perpendicular to the longitudinal axis of the holding cup, and wherein the second drive component is created by a second conical gear wheel on the object which is connected to the first conical gear wheel when the object is inserted into the holding cup and the rotational axis of which is concentric to the longitudinal axis of the object.

7. The positioning device according to claim 2, wherein the first drive component is created by a first radially geared wheel, the rotational axis of which extends parallel to the longitudinal axis of the holding cup, and wherein the second drive component is created by a second radially geared wheel on the object which is connected to the first radially geared wheel when the object is inserted into the holding cup and the rotational axis of which is concentric to the longitudinal axis of the object.

8. The positioning device according to claim 1, wherein the object inserted in the holding cup extends over the holding cup in axial direction with an axial end section, wherein the drive component of the object is located in this axial end section.

9. The positioning device according to claim 1, wherein the holder is located on a support arm which swivels around a trunnion axis, which is parallel to the longitudinal axis of the holding cup.

10. The positioning device according to claim 9, wherein the rotation device is at least partly held by the support arm.

11. The positioning device according to claim 1, wherein the object is designed as a holder for an optical component, such as a lens, a prism, or a filter.

12. A holder for an optical component having a drive component enabling a connection, wherein the drive component is designed as at least one of a group comprising a radial ledge and a radial indentation, wherein the drive component is adapted for coupling with a positioning device for providing a rotational adjustment of the holder, and wherein the positioning device comprises:
- a positioning device holder with a holder cup into which the object can be inserted in radial direction, and
- a rotation device acting together with the object when the object is inserted into the positioning device holder cup, enabling a rotational adjustment of the object around its longitudinal axis with respect to the holder cup,
- wherein the rotation device interacts with the drive component for performing the rotational adjustment of the object.

13. The holder according to claim 12, wherein the drive component is provided by at least one recess on the outer cover of the holder or by a conical gear wheel or a radially geared wheel, wherein one rotational axis of the gear wheel is concentric to the rotational axis of the holder.

14. The holder according to claim 13, wherein the recess has two side walls, which are opposite to each other and parallel to the rotational axis of the holder.

15. The holder according to claim 13, wherein the recess extends to an axial end of the holder, where it ends open in axial direction.

16. The holder according to claim 12, wherein the optical component contains an optic axis, which is parallel to the rotational axis of the holder wherein the optical component with respect to its optic axis is eccentric to the rotational axis of the holder and is connected to the holder.

17. The holder according to claim 12, wherein the drive component is located at or in an axial end section of the holder.

18. The holder according to claim 12, wherein the optical component is at least one of a group comprising: a lens, a prism, and a filter.

19. A method for positioning an object, with the steps:
- inserting the object in radial direction in a holding cup,
- coupling with a drive component provided on the object and having at least one of a group comprising a radial ledge and a radial recess, and
- rotational adjustment of the object around its longitudinal axis with respect to the holding cup by interacting with the drive component.

* * * * *